July 16, 1940.                E. J. SIMANEK                2,208,107
                              BRAKE RIGGING
                         Filed April 25, 1938         2 Sheets-Sheet 1

INVENTOR.
Edward J. Simanek
BY
ATTORNEY.

July 16, 1940.　　　　E. J. SIMANEK　　　　2,208,107
BRAKE RIGGING
Filed April 25, 1938　　　2 Sheets-Sheet 2
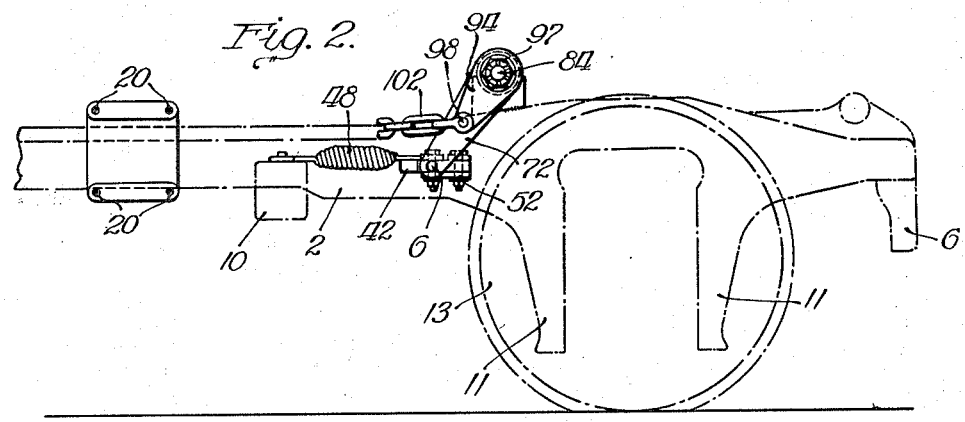
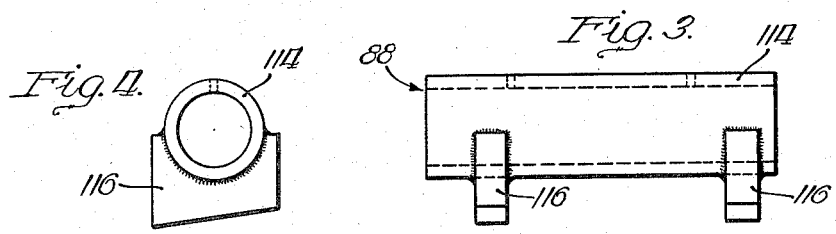
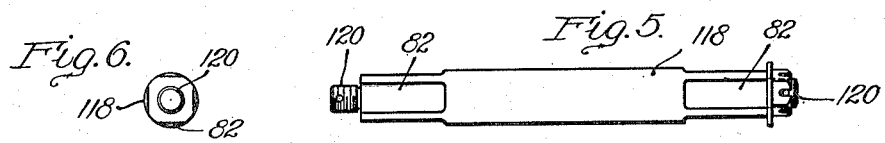
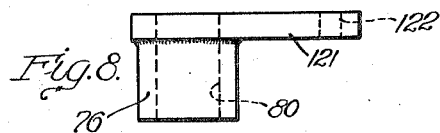
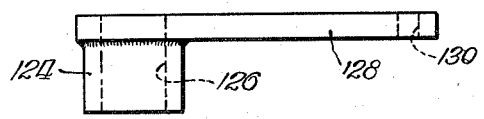
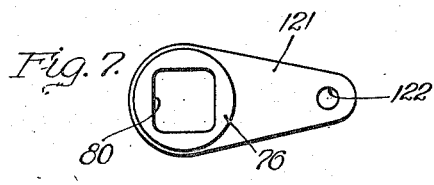
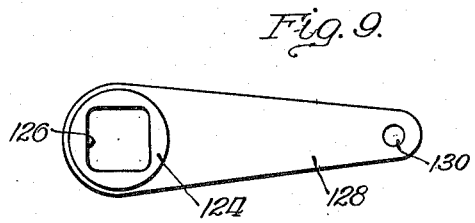
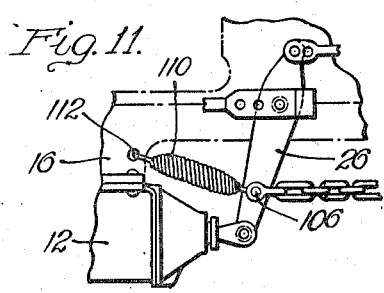
INVENTOR.
Edward J. Simanek
BY
ATTORNEY.

Patented July 16, 1940

2,208,107

UNITED STATES PATENT OFFICE 2,208,107

BRAKE RIGGING

Edward J. Simanek, Chicago, Ill., assignor to American Steel Foundries, Chicago, Ill., a corporation of New Jersey Application April 25, 1938, Serial No. 203,992

6 Claims. (Cl. 188—107)

My invention relates to brake rigging for a railway car and more particularly to a hand brake arrangement for a unit cylinder clasp brake of the general type heretofore described in United States Letters Patent 2,064,367, issued December 15, 1936, to Walter H. Baselt.

An object of my invention is to design a hand brake arrangement which will be suitable for certain types of clasp brake arrangements wherein operating means therefor are mounted on the side rails of the truck frame.

My invention contemplates an arrangement wherein the power applied by the hand brakes may be transmitted across or through the truck frame without the use of the usual fulcrum levers, an objection to which sometimes arises because of the space required in their operation.

My invention also comprehends a hand brake arrangement for such a car truck as that described wherein the power generated by the hand brakes will be transmitted to the brake rigging in part through a shaft mounted on the truck frame.

For the sake of clarity, certain details are omitted from each of the figures where they are more clearly shown in other figures.

Figure 2 is a side elevation of the truck and brake arrangement shown in Figure 1;

Figure 3 is a side elevation of the shaft bearing incorporated in my novel hand brake arrangement;

Figure 4 is an end view of said bearing;

Figure 5 is an elevational view of the form of shaft incorporated in my invention;

Figure 6 is an end view of said shaft;

Figure 7 is a plan view of one form of lever incorporated in my invention and Figure 8 is a side elevation thereof;

Figure 9 is a plan view of another form of brake lever incorporated in my invention and Figure 10 is a side elevation thereof; and Figure 11 is a fragmentary view showing a modified form of release means for my novel hand brake.

Figure 1:
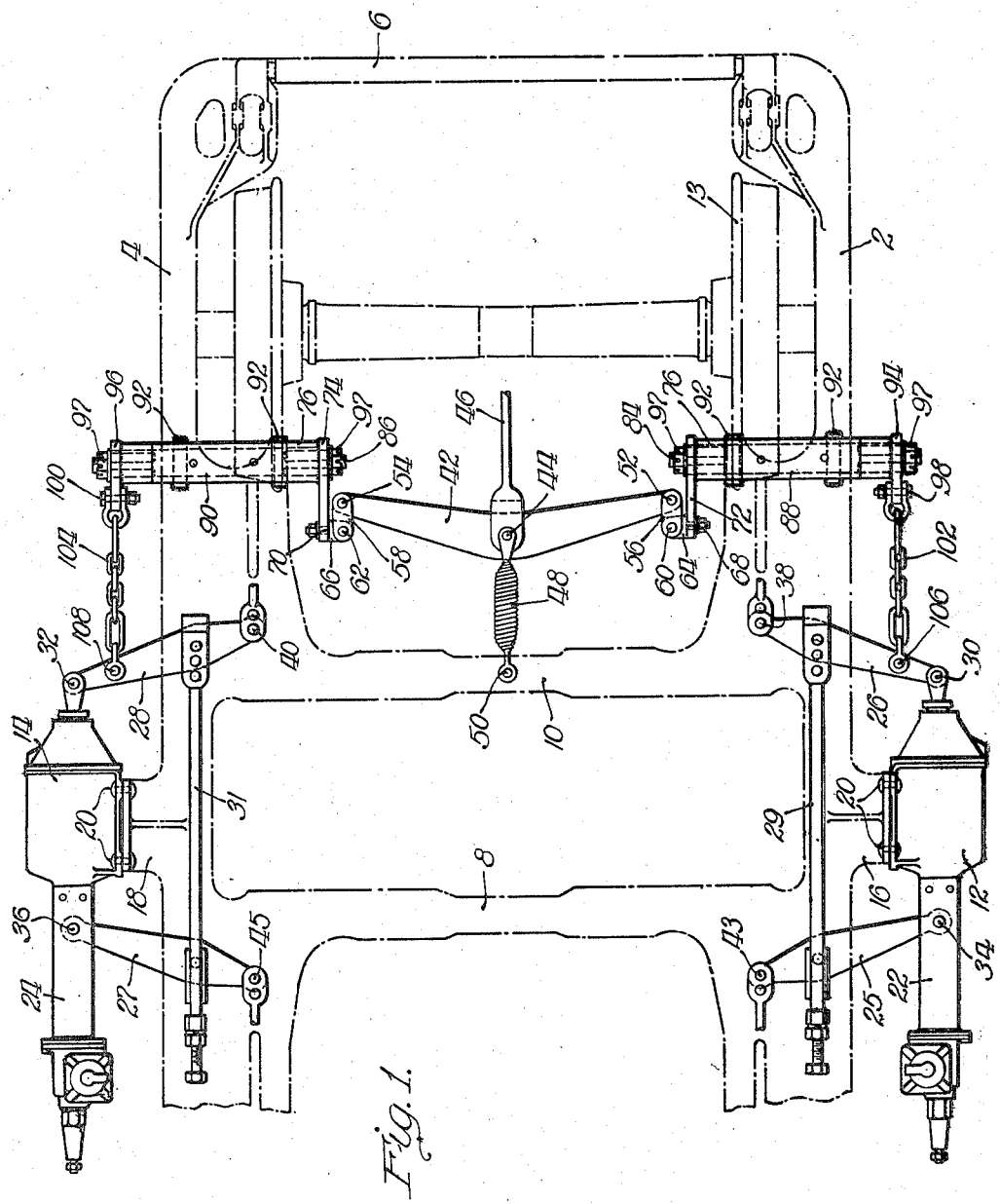
Figure 1 is a top plan view showing a portion of a car truck with my novel hand brake arrangement embodied therein.

It may be observed that only one end of the truck structure is shown inasmuch as my novel hand brake arrangement is applied at only one end of the truck.

Describing my novel structure in more detail, the truck frame is of well known form having the side frames 2 and 4 joined by the integrally formed end rail 6 and spaced transoms 8 and 10 between which may be supported a swinging bolster for support of the car body in the usual manner. The side frames have the jaws indicated at 11, 11 for cooperation with the conventional journal boxes (not shown) of the wheel and axle assembly 13. Power means for the usual clasp brake rigging (not shown) is in the form of brake cylinders 12 and 14 carried centrally of the side frames on the integrally formed brackets 16 and 18, said cylinders being secured thereto as at 20, 20. Opposite the piston end each of the cylinders 12 and 14 carries a slack adjuster indicated respectively at 22 and 24 and said power means and slack adjusters are operatively connected to control the rigging in the manner described in the previously mentioned Baselt Patent No. 2,064,367, said operative connections comprising the live cylinder levers 26 and 28 and the dead slack adjuster levers 25 and 27 interconnected respectively by the adjustable pull rods 29 and 31, said live cylinder levers being connected at their outer ends as at 30 and 32 to the cylinder pistons and said dead slack adjuster levers being fulcrumed from said slack adjusters as at 34 and 36. The inner ends of the live cylinder levers 26 and 28 and of the dead slack adjuster levers 25 and 27 are operatively connected respectively as at 38 and 40, 43 and 45 to actuate the clasp brake rigging as described in the previously mentioned patent.

In my novel hand brake arrangement the central equalizer 42 is connected at its mid-point as at 44 to the pull rod 46, the opposite end of said pull rod having a connection to hand brake operating means mounted on the car body in any convenient manner. Likewise connected at the pivot point 44 is the release spring 48 whose opposite end has a connection as at 50 to the transom 10, said release spring serving to release said rigging after actuation by said hand brakes. The oposite ends of the equalizer 42 are pivotally connected as at 52 and 54 to the links 56 and 58, said links having their opposite ends pivotally connected as at 60 and 62 to the eye bolts 64 and 66, said eye bolts being secured as at 68 and 70 on the ends of the levers or cranks 72 and 74, said cranks having at their other ends the hollow lugs 76, 76 with the central substantially square openings 80, 80 (Figure 7) within which may be received the square ends 82, 82 (Figure 5) of the rotating shafts 84 and 86. The shafts 84 and 86 are journaled within the bearings 88 and 90, said shafts being mounted transversely of the frame on the brackets 92, 92 secured to said frame by welding or other convenient means. The opposite ends of the shafts 84 and 86 extend outwardly of the bearings 88 and 90 and on said outer ends are mounted the cranks or levers 94 and 96 in manner similar to mounting of the levers at the opposite ends of the shafts, said cranks being secured on said shafts as by means of the nuts 97, 97 threaded on the ends thereof. The extending arms of the cranks 94 and 96 have pivotal connections as at 98 and 100 to the flexible members or chains 102 and 104, the opposite ends of said flexible members having pivotal connections as at 106 and 108 to points intermediate the ends of the cylinder levers 26 and 28.

Figures 3 and 4 show the detail structure of the bearings 88 and 90 within which are journaled the transverse shafts 84 and 86. It may be observed that the bearing comprises a cylindrical member or barrel 114 mounted on the spaced blocks 116, 116, said blocks being welded or otherwise conveniently secured on the tops of the side frames as heretofore described.

Figures 5 and 6 show in detail the form of the transverse shafts, each of which has the enlarged central cylindrical portion 118 reduced at each end to form the before mentioned square portions 82, 82, and further reduced at their extremities to form the threaded ends 120, 120 on which may be received the nuts, already described.

Figures 7 and 8 show the detail structure of the cranks 94 and 96 which are mounted outwardly of the frames on the shafts, already described. Each crank has at its enlarged end the hollow cylindrical lug or boss 76 with the central substantially square opening 80 which may be fitted over the square end 82 of the transverse shaft to rotate therewith. The lever arm 121 of the crank is drilled as at 122 for connection to the flexible member leading to the live cylinder lever.

Figures 9 and 10 show the detail structure of the cranks 72 and 74. It will be observed that the structure is generally similar to that of the crank shown in Figures 7 and 8 with the enlarged hollow boss or lug 124 having the substantially square central opening 126 for reception of the square end of the transverse shaft. The lever arm 128 is somewhat elongated as compared with that of the crank previously described and has also the drilling adjacent the small end as at 130 for connection to the equalizer 42 as previously described.

Figure 11 shows an alternative form for a release means for my novel hand brake arrangement. In this alternate arrangement two release springs are required instead of one, that is, one associated with the live cylinder lever at each side of the truck frame. Figure 11 shows the arrangement at one side of the truck wherein it will be observed that the release spring 110 has a pivotal connection as at 106 to a point intermediate the ends of the live cylinder lever 26, the opposite end of said release spring having a pivotal connection as at 112 to the bracket 16 whereon is mounted the power means 12. The release spring at the opposite side of the truck would be likewise connected between the live cylinder lever 28 and the bracket 18.

In operation, assuming the parts to be in released position, actuation of the hand brake power means on the car body would be transmitted through any convenient means to the pull rod 46, thus moving to the right (Figure 1) the equalizer 42 and causing counter-clockwise rotation (Figure 2) of the cranks 72 and 74, thus rotating the shafts 84 and 86 in their journals or bearings 88 and 90 and applying rotation to the cranks 94 and 96 mounted on the outer ends of said shafts, thus moving to the right the flexible members 102 and 104 and operating the live cylinder levers 26 and 28, and through the pull rods 29 and 31 also operating the dead slack adjuster levers 25 and 27. Said cylinder levers and said slack adjuster levers functioning to apply the brake mechanism in the same manner as if actuated by the power means 12 and 14. Release of the hand brake power means permits the release spring 48 to function, moving the equalizer 42 to the left (Figure 1) and releasing the brakes by causing the various parts to move in directions reverse to those just mentioned.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a railway car truck, a frame having side members and a transverse member, a supporting wheel and axle assembly, brake actuating means supported on each side member and comprising power means, interconnected live and dead cylinder levers connected at opposite ends of said power means, hand brake means connected to said live livers, said hand brake means comprising crank shafts mounted on each of said side members transversely thereof with relatively short lever arms outwardly of said side members and relatively long lever arms inboard thereof, flexible means connecting said short lever arms to said live cylinder levers intermediate the ends thereof, an equalizer operatively connected between said long lever arms, and release means connected between said transverse member and said equalizer, all of said hand brake means being positioned between vertical planes defined by said transverse member and the adjacent wheel and axle assembly.

2. In a railway car truck, a frame having side members and transverse end and intermediate members, a supporting wheel and axle assembly between said transverse members, brake actuating means supported on each of said side members comprising power means, interconnected live and dead cylinder levers connected at opposite ends of said power means, and hand brake means mounted on said truck between transverse vertical planes defined by said intermediate transverse member and the adjacent wheel and axle assembly, said hand brake means comprising crank shafts mounted on said side members transversely thereof with relatively short lever arms outboard of said side members and relatively long lever arms inboard thereof, a flexible connection between each of said live levers and the adjacent short lever arm, an equalizer operably connected between said long lever arms to rotate therewith, release means connected between said intermediate transverse member and said equalizer, and operating means connected to said equalizer at the point of connection of said release means.

3. In a car truck, a frame having side members and a transom, a supporting wheel and axle assembly, brake actuating means at the opposite sides of said frame comprising power means and slack adjuster means supported from said side members, adjustably interconnected live and dead levers operatively connected respectively to said power means and said slack adjuster means at each side of said frame, and hand brake means comprising transverse crank shafts journaled on said side members between said transom and said wheel and axle assembly, each of said crank shafts having a relatively long lever arm inboard the truck and a relatively short lever arm outboard thereof, flexible connections between said short lever arms and the adjacent live levers, an equalizer operatively connected between said long lever arms to rotate therewith between said transom and the adjacent wheel and axle assembly, and release and operating means connected at the mid-point of said equalizer, said release means having a connection with said transom.

4. In a railway car truck, a frame having side members and a transom, a supporting wheel and axle assembly, brake actuating means including power means mounted on each of said side members, interconnected live and dead cylinder levers connected at opposite ends of said power means respectively, and hand brake means mounted on said side members between said transom and the adjacent wheel and axle assembly and comprising transverse crank shafts mounted on said side members with relatively short lever arms on the outboard ends thereof and relatively long lever arms inboard of said truck, flexible connections between said short lever arms and points intermediate the ends of said live cylinder levers respectively, an equalizer operatively connected between said long lever arms to rotate therewith between said transom and the adjacent wheel and axle assembly, operating means connected at the mid-point of said equalizer, and release means connected between said side members and said live cylinder levers.

5. In a railway car truck, a frame having a transom and side members, a supporting wheel and axle assembly, brake actuating means comprising power means and slack adjuster means mounted on the opposite side members outboard thereof, interconnected live and dead cylinder levers pivotally attached respectively to said power means and to said slack adjuster means at each side of said frame, hand brake means mounted on said side members between said transom and the adjacent wheel and axle assembly and comprising transverse crank shafts mounted on each side member with relatively long lever arms inboard of said truck and relatively short lever arms outboard thereof, flexible connections between said short lever arms and the adjacent live cylinder levers, an equalizer operatively connected between said long lever arms to rotate therewith between said transom and the adjacent wheel and axle assembly, and release and operating means connected to the mid-point of said equalizer, said release means having a connection with said transom.

6. In a railway car truck, a frame having a transom and side members, a supporting wheel and axle assembly, brake actuating means comprising power means and slack adjuster means mounted on the opposite side members outboard thereof, interconnected live and dead cylinder levers pivotally attached respectively to said power means and to said slack adjuster means at each side of said frame, hand brake means mounted on said side member between said transom and the adjacent wheel and axle assembly and comprising transverse crank shafts mounted on each side member with relatively long lever arms inboard of said truck and relatively short lever arms outboard thereof, flexible connections between said short lever arms and the adjacent live cylinder levers, an equalizer operatively connected between said long lever arms to rotate therewith between said transom and the adjacent wheel and axle assembly, operating means connected at the mid-point of said equalizer and release means connected between said side members and said live cylinder levers respectively at opposite sides of the truck.

EDWARD J. SIMANEK.